United States Patent [19]
Kraft

[11] 3,918,793
[45] Nov. 11, 1975

[54] FLUORESCENCE ILLUMINATOR FOR INCIDENT LIGHT MICROSCOPE

[75] Inventor: Winfried Kraft, Werdorf, Germany
[73] Assignee: Ernst Leitz G.m.b.H.
[22] Filed: July 6, 1973
[21] Appl. No.: 377,042

Related U.S. Application Data
[63] Continuation of Ser. No. 138,235, April 28, 1971, abandoned.

[30] Foreign Application Priority Data
Nov. 13, 1970  Germany............................ 2055944
May 2, 1970  Germany............................ 2021654

[52] U.S. Cl. .................................................. 350/91
[51] Int. Cl.$^2$......................................... G02B 21/16
[58] Field of Search................................. 350/91, 1

[56] References Cited
UNITED STATES PATENTS
1,891,348   12/1932   Ellinger et al. ......................... 350/1
3,277,782   10/1966   Smith................................. 350/91 X OTHER PUBLICATIONS
Ploem, Article in *Zeitschrift fur Wissenschaftliche Mikroskopie*, Vol. 68, 1967, pp. 129–142 and cover page cited.

*Primary Examiner*—David H. Rubin
*Attorney, Agent, or Firm*—Krafft & Wells

[57] ABSTRACT

A fluorescence illuminator for incident light for a microscope system having an exciter filter, a reflecting mirror, a dichromatic splitter mirror and a blocking filter located along an exciter light beam axis and the microscope having an optical axis for a fluorescing object, wherein the reflecting mirror and the dichromatic splitter mirror are arranged so that the exciter light beam forms an angle $\alpha$ with the fluorescing object optical axis to produce an optimum separation of the exciter light beam and the fluorescing light beam emanating from the fluorescing object.

13 Claims, 9 Drawing Figures

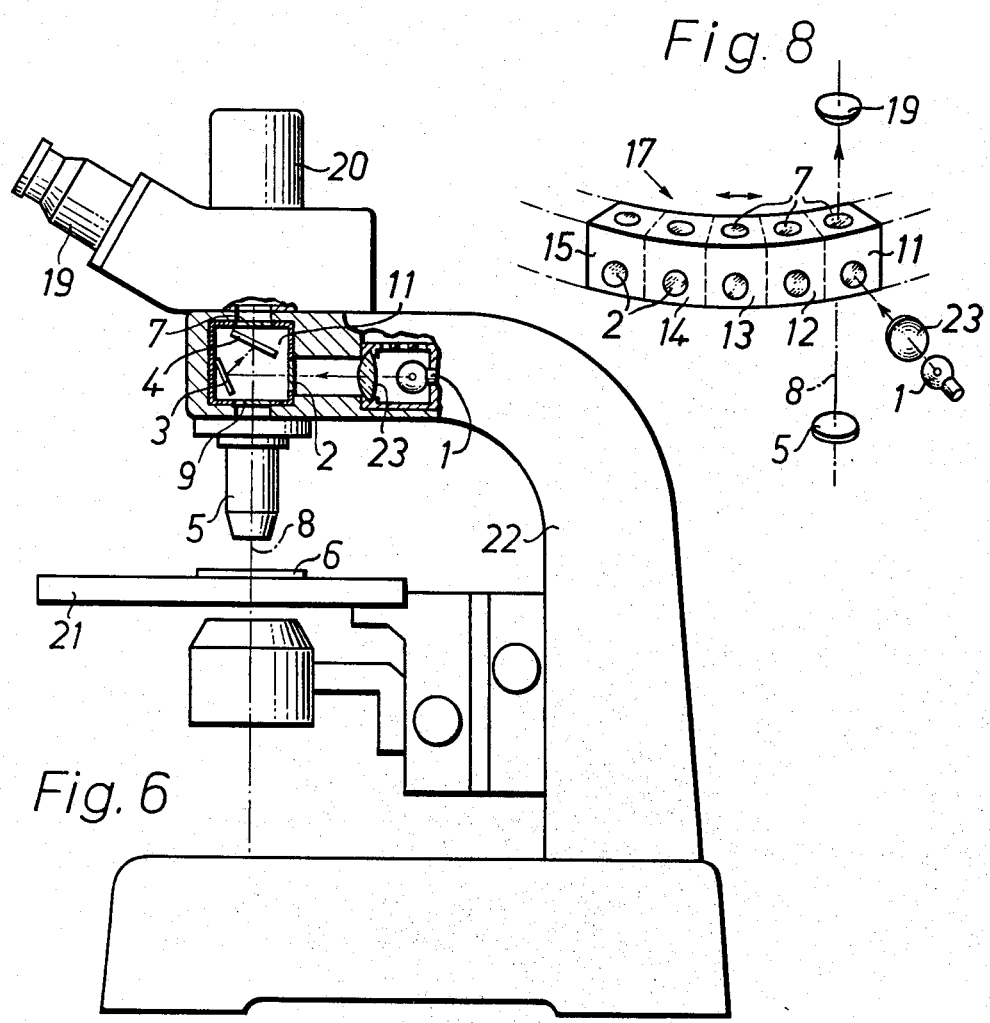
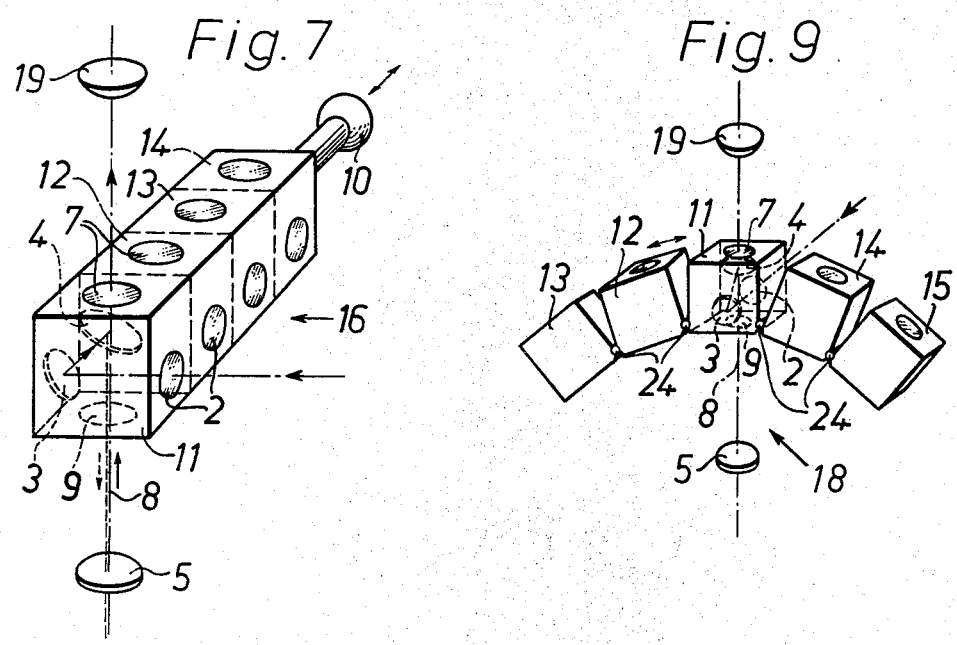

FLUORESCENCE ILLUMINATOR FOR INCIDENT LIGHT MICROSCOPE

CROSS REFERENCE TO RELATED APPLICATIONS

The present application is a continuation of Application Ser. No. 138,235, filed Apr. 28, 1971, and now abandoned.

BACKGROUND OF THE INVENTION

The field of the invention are optical systems having compound lens systems for fluorescent excitation.

The invention is particularly related to a fluorescence illuminator for incident light, consisting essentially of an exciter filter, a reflecting mirror, a dichromatic splitter mirror and a blocking filter.

In a conventional vertical illuminator for fluorescent miscroscopy, several dichromatic splitter mirrors which are inserted successively in the light beam path and are effective for different wave length ranges are disposed on a revolving nosepiece so that they are at a 45° angular position with respect to the impinging exciter light ("Zeitschrift fuer wissenschaftliche Mikroskopie". Vol. 68 [1967 b], p. 129).

However, the slope of the reflecting borders of the dichromatic splitter mirrors employed heretofore is insufficient for satisfying the constantly increasing demands in fluorescent microscopy. In the case of the fluorescence-active dyes (fluorochromes), employed to an increasing extent in modern fluorescence microscopy, particularly in immunofluorescence, such as, for example, fluorescein isothiocyanate (FITC), the wave length maxima for the excitation and emission radiations are very closely adjacent to each other. It can be seen therefrom that, for the exact separation of the two maxima, filters must be available having steep reflection borders disposed between both maxima.

SUMMARY OF THE INVENTION

The invention is based on the concept of making the reflecting border of the dichromataic splitter mirror considerably steeper by reducing the exciter light beam angle (from $\alpha = 90°$ to $\alpha = 0°$), as well as providing a changing device for the exciter filter, the reflecting mirror, the dichromatic splitter mirror, and the blocking filter. This makes it possible to exchange the above-mentioned components for those of the same type, but having a modified physical function (for example different absorption or reflecting borders).

In accordance with the present invention, in the exciter light beam is provided an exciter filter, thereafter a reflecting mirror and a dichromatic splitting mirror disposed in the imaging beam path. By arranging, in dependence on the respective fluorescing object, the reflecting mirror and the dichromatic splitting mirror in such a manner with respect to each other that the exciter light beam directed toward the dichromatic splitting mirror forms an angle $\alpha$ with the beam path imaging the object so that an optimum separation of the exciter light and of the fluorescent light emanating from the fluorescing object is attained. Since the steepness of the reflecting border of dichromatic splitter mirrors depends on the direction of impinging light, it is thus possible to obtain a considerably steeper reflecting border of the dichromatic splitter mirror by varying the angle of incidence $\alpha$ toward smaller angles. This results is an optimum separation of excitation and emission radiation of the fluorescing specimens. The angle $\alpha$ may range from 90 to 0 degrees with a preferred range of 70 to 15 degrees.

In accordance with a further embodiment of the invention, a second dichromatic splitter mirror or a dichromatic reflecting mirror is disposed at that point in the exciter light path at which the reflecting mirror is normally arranged (FIG. 2), wherein suitably the angle $\beta$ of 90° formed by the exciter light beam and the vertically extending optical axis of the fluorescence illuminator is simultaneously varied toward higher values (angular interval for $\beta$ between 90° and 180°). The additional dichromatic splitter mirror provides a preselection of the exciter light, so that no excitation filter need be inserted between the light source and this dichromatic splitter mirror.

It is also possible to provide a structural system consisting of an exciter filter, a reflecting mirror, a dichromatic splitter mirror, and a blocking filter as a functional unit and to combine at least two of these compounds of the same type, but exhibiting different physical properties, into a holder disposed displaceably with respect to the optical axis of the direct fluorescence illuminator, or to mount such composite structures together on a support. The support can be a linear slide, a curved slide, a revolving nosepiece, or a chain which can also be fashioned as an endless train. It is also possible to provide motor means for displacing the support, which means are effective optionally in dependence on a program control.

The advantages attained by the present invention reside particularly in that a more perfect separation of excitation and emission radiation is achieved by the greater steepness of the reflecting border of the dichromatic splitter mirror. This leads to a considerable improvement in intensity and contrast, as well as to an optimum excitation of fluorescence-active objects in the entire spectral range under consideration and, consequently, this results in a broadening of the range of application of fluorescent microscopy. Besides, it is made possible by the special arrangement of the structural unit, in a di- or multiple-fluorochromatized object, to make different object details recognizable in rapidly changing succession.

BRIEF DESCRIPTION OF THE DRAWINGS

In the drawings, several embodiments of the invention are illustrated and they are described in greater detail hereinbelow.

In the drawings:

FIG. 4 is a schematic view of the beam path in a fluorescence illuminator for incident light in an embodiment deviating from that of FIG. 1 with a rotatably mounted interference blocking filter 7a;

FIG. 6 is a lateral view of a microscope equipped with a fluorescence illuminator for incident light;

FIG. 7 shows a linear slide, consisting of several structural units, as the support;

FIG. 8 shows a curved slide, consisting of several structural units, as the support; and FIG. 9 illustrates a train consisting of several structural units, as the support.

DESCRIPTION OF THE PREFERRED EMBODIMENTS

Figure 1:
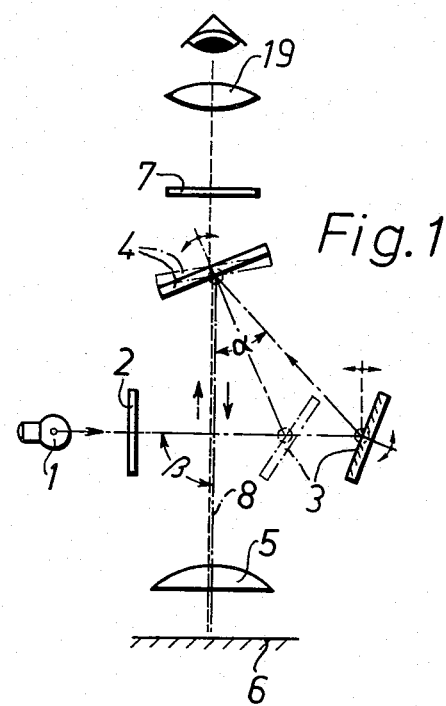
FIG. 1 shows a schematic representation of the beam path in a fluorescence illuminator for incident light according to the present invention.

In FIG. 1, a beam of light rays emanates from a light source 1 and passes through the vertically disposed excitation filter 2, wherein a certain limited spectral range is filtered out. The exciter light beam intersects the vertically disposed optical axis 8 of the fluorescence illuminator at an angle $\beta = 90°$ and impinges on a reflecting mirror 3 reflecting the exciter light beam to the dichromatic splitter mirror 4. An angle $\alpha$ is formed by the exciter light beam impinging on the dichromatic splitter mirror 4 and the optical axis of the fluorescence illuminator. The excitation light reflected from the dichromatic splitter mirror 4 passes in parallel to the optical axis of the fluorescence illuminator through the objective 5, which simultaneously serves as a condenser, to the microscopic specimen or object 6. The image of the fluorescing object is reproduced in the intermediate image plane of the ocular. The dichromatic splitter mirror 4 exhibits optimum transmissivity for the fluorescent light and reflects— according to the increased reflecting power— the residual proportion of exciter light back to the light source 1. A blocking filter 7 arranged at right angle to the optical axis of the fluorescence illuminator prevents, in the imaging beam path, any further passage of the excitation light in the direction of the ocular. A selective filter can be inserted additionally or alternatively to the blocking filter 7.

Figure 2:
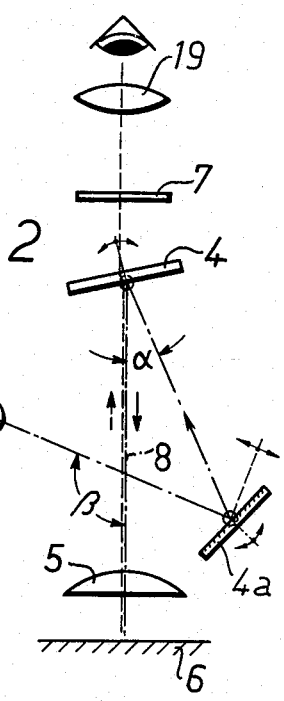
FIG. 2 is a schematic view of the beam path in a specific embodiment for a fluorescence illuminator for incident light with a second dichromatic splitter mirror or dichromatic reflecting mirror in place of the usual reflecting mirror.

In FIG. 2, an additional dichromatic splitter mirror or dichromatic reflecting mirror 4a has been provided in place of the reflecting mirror 3 of FIG. 1. The angle $\beta$ formed by the light beam emanating from the light source and the optical axis of the fluorescence illuminator is larger than 90° and can be varied within the limits of 90°–180°.

Figure 3:
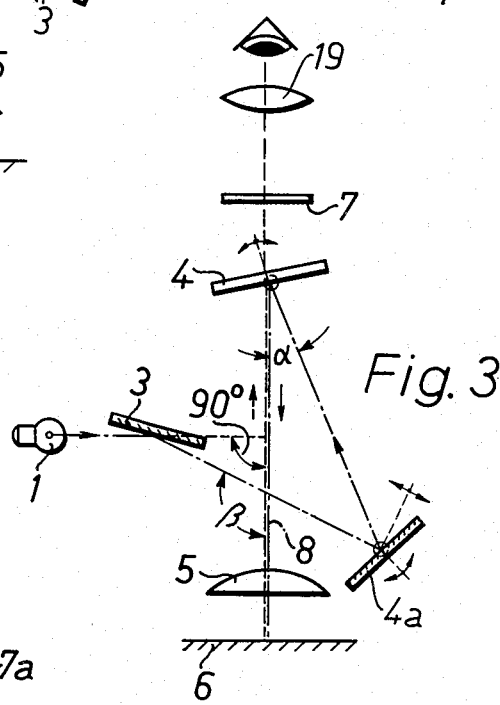
FIG. 3 is a schematic illustration of the beam path in a fluorescence illuminator for incident light in an embodiment slightly modified as compared to FIG. 2, with an exciter light beam which, at first, extends horizontally.

FIG. 3 additionally shows a reflecting mirror 3 besides the two dichromatic splitter mirrors 4 and 4a, respectively. The light rays emanate primarily at an angle of 90° to the optical axis of the fluorescent illuminator, are reflected on this mirror 3 and then pass under an angle of $\beta > 90°$ the optical axis of the fluorescence illuminator and impinge on the dichromatic splitter mirror 4a.

Figure 4:
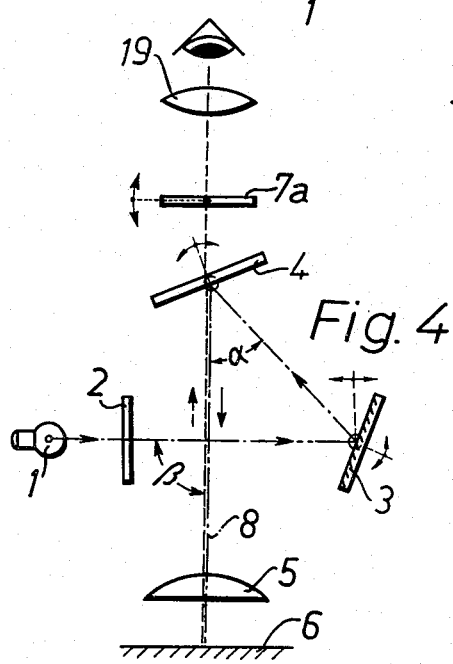

In accordance with a further embodiment shown schematically in FIG. 4, an interference blocking filter 7a is disposed to be tiltable about an axis perpendicular to the plane formed by the optical axis of the fluorescence illuminator and of the exciter light beam. By tilting the interference blocking filter, a minor shift in the interference blocking filter border is attained.

Figure 5:
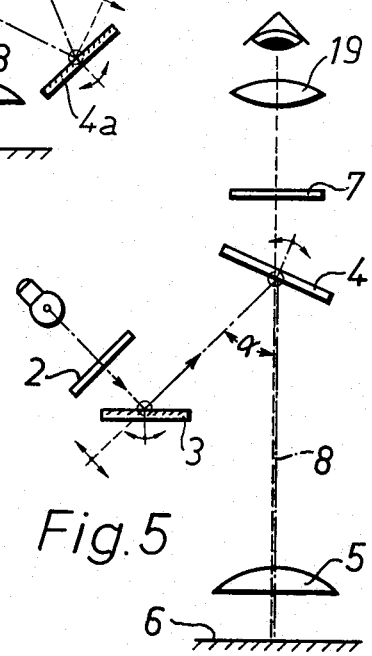
FIG. 5 is a schematic representation of the beam path in a fluorescent illuminator for incident light with a horizontally disposed reflecting mirror.

A further arrangement according to the present invention is illustrated schematically in FIG. 5. This embodiment is characterized by the reflecting mirror 3 disposed at right angles to the optical axis of the fluorescence illuminator.

In FIG. 6, a microscope is illustrated containing a fluorescence illumination for incident light of the above-described type in the operative position. A beam of light rays emanating from a light source 1 housed in the microscope arm 22 impinges, after passage through lens 23, successively on the structural components pertaining to the unit 11; exciter filter 2, reflecting mirror 3, and dichromatic splitter mirror 4. From there, the beam passes along the optical axis 8 of the fluorescence illuminator, which axis is congruent with the optical axis of the microscope, through an aperture 9 out of the structural unit 11 and passes, via an objective 5, to the specimen or object 6 disposed on the microscope stage 21.

The fluorescent light emanating from the specimen passes through the objective 5, the aperture 9 of the unit 11 and the dichromatic splitter mirror 4, to the blocking filter 7 which latter blocks the further passage of the exciter light still present. From there, the fluorescent light passes, for direct observation, into the binocular 19 or into a short tube 20 provided for the attachment of a measuring device.

In FIG. 7, a support 16 is illustrated which is composed of several structural units 11–14. This support is shifted by means of a handle 10 relatively to the optical axis of the microscope shown in FIG. 6 and at right angle to the plane of the drawing. Each unit has its optimum functional range for a specific fluorescent wave length. Therefore, it is possible to examine di- or multiple-fluorochromatized specimens in rapid chronological succession by the alternating insertion of the respectively optimally effective unit.

By means of an arresting device, it is possible to ensure the exact positioning of the respective unit with reference to the optical axis of the microscope.

The fact that it is also possible to fashion the support in designs different from the configuration described above is shown in FIG. 8, wherein five units 11–15 are disposed on a curved support 17. It is also possible to make the support in the form of a complete circle.

In the embodiment shown in FIG. 9, the units 11–15 are combined into a train 18 by means of connecting links 24, so that they form a support. It is furthermore possible to employ, as the support for the structural elements, a revolving nosepiece which is not illustrated herein.

As set forth above, the units of FIG. 7 are, in each instance, equipped with an exciter filter, a reflecting mirror, a dichromatic splitter mirror, as well as a blocking filter. It is likewise possible to employ, in one structural unit, several blocking filters simultaneously, which filters supplement one another with respect to their physical properties. The same applies with respect to the use of several exciter filters in one and the same functional unit.

I claim:

1. A fluorescence illuminator for incident light for a microscope system including:
   a light source generating an exciter light beam having an axis;
   an objective lens;
   a fluorescing object generating a fluorescent light beam having an axis;
   viewing means located along an imaging beam axis positioned between said viewing means and said objective lens, said imaging beam axis and said fluorescent light beam axis being coincident;

a reflecting mirror positioned along said exciter light beam axis and deflecting said exciter light beam to said fluorescent light beam axis and generating a deflected exciter light beam axis subtending an angle $\alpha$ of about 70°–15° with said fluorescent light beam axis, said reflecting mirror tiltable about an axis perpendicular to a plane formed by said fluorescent light beam axis and by said exciter light beam axis, said reflecting mirror having means for displacement along said exciter light beam axis;

a dichromatic splitter mirror producing a steeply reflecting border as light strikes it at angles approaching the normal and at smaller angles of incidence located on said imaging beam axis at the intersection of said fluorescent light beam axis and said deflected exciter light beam axis between said objective lens and said viewing means, said dichromatic splitter mirror tiltable about an axis perpendicular to a plane formed by said fluorescent light beam axis and by said exciter light beam axis, said dichromatic splitter mirror reflecting said exciter light beam toward said fluorescing object along said fluorescent light beam axis and transmitting said fluorescent light beam toward said viewing means, said fluorescent light beam having a wave length longer than that of said exciter light beam, said angle $\alpha$ providing an optimum separation of said exciter light beam and said fluorescent light beam; and a blocking filter positioned at a position on said imaging beam axis between said dichromatic splitter mirror and said viewing means.

2. The fluorescence illuminator defined by claim 1, wherein means are provided for coupling said reflecting mirror and said dichromatic splitter mirror for the combined pivoting of both mirrors from one point.

3. The fluorescence illuminator defined by claim 1, wherein said reflecting mirror is a dichromatic reflecting mirror.

4. The fluorescence illuminator defined by claim 1, wherein said reflecting mirror is a second dichromatic splitter mirror.

5. The fluorescence illuminator defined by claim 1, wherein said exciter light beam emanates from an external light source and intersects said fluorescent light beam axis before said reflecting mirror at an angle $\alpha$ of 90°.

6. The fluorescence illuminator defined by claim 1, wherein said exciter light beam emanates from an external light source and intersects said fluorescent light beam axis before said reflecting mirror at an angle $\beta$ wherein the relationship $90° \leq \beta \leq 180°$ applies the maximim value possible for angle $\beta$ being bounded by the value of angle $\alpha$.

7. The fluorescence illuminator defined by claim 1, wherein said reflecting mirror is located in a plane on which said fluorescent light beam axis is perpendicularly located.

8. The fluorescence illuminator defined by claim 1, said blocking filter being an interference blocking filter.

9. The fluorescence illuminator defined by claim 8, wherein said interference blocking filter has means for tilting about an axis which is disposed perpendicularly to the plane formed by said fluorescent light beam axis and said exciter light beam.

10. The fluorescence illuminator defined by claim 8, further comprising means for exchanging said blocking filter with others.

11. The fluorescence illuminator defined in claim 8, wherein said exciter filter, said reflecting mirror, said dichromatic splitter mirror, and said blocking filter form a structural unit as a functional composite; and that a plurality of these structural units of the same type, are combined into a support displaceably arranged with respect to said fluorescent light beam axis.

12. The fluorescence illuminator defined by claim 11, wherein said support comprises a train of said units.

13. The fluorescence illuminator defined by claim 11, wherein means are provided for shifting said support.

* * * * *

UNITED STATES PATENT OFFICE
CERTIFICATE OF CORRECTION

Patent No. 3,918,793          Dated November 11, 1975

Inventor(s) Winfried Kraft

It is certified that error appears in the above-identified patent and that said Letters Patent are hereby corrected as shown below:

In Claim 5, line 4, "angle $\alpha$" should be ------angle $\beta$ ---------

Signed and Sealed this

First Day of February 1977

[SEAL]

*Attest:*

RUTH C. MASON
*Attesting Officer*

C. MARSHALL DANN
*Commissioner of Patents and Trademarks*